United States Patent [19]
Hur

[11] Patent Number: 5,808,802
[45] Date of Patent: Sep. 15, 1998

[54] HEAD-MOUNTED DISPLAY APPARATUS WITH A SINGLE IMAGE DISPLAY DEVICE

[75] Inventor: Se-Hurn Hur, Seoul, Rep. of Korea

[73] Assignee: Daewoo Electronics Co. Ltd., Rep. of Korea

[21] Appl. No.: 806,881

[22] Filed: Feb. 25, 1997

[30] Foreign Application Priority Data

Nov. 15, 1996 [KR] Rep. of Korea ................. 1996-54561
Nov. 15, 1996 [KR] Rep. of Korea ................. 1996-54564

[51] Int. Cl.$^6$ ................................................. G02B 27/14
[52] U.S. Cl. ........................................... 359/630; 359/631
[58] Field of Search ................................... 359/618, 629, 359/630, 631, 632, 633, 636, 637, 638, 639; 345/7, 8

[56] References Cited

U.S. PATENT DOCUMENTS

| | | | |
|---|---|---|---|
| 4,082,440 | 4/1978 | Bennett | 353/26 R |
| 4,636,866 | 1/1987 | Hattori et al. | 358/236 |
| 5,348,477 | 9/1994 | Welch et al. | 434/43 |
| 5,467,205 | 11/1995 | Kuba et al. | 359/40 |
| 5,646,783 | 7/1997 | Banbury | 359/630 |

FOREIGN PATENT DOCUMENTS

| | | |
|---|---|---|
| 0539907 | 5/1993 | European Pat. Off. . |
| 2261804 | 10/1992 | United Kingdom . |
| 9504435 | 2/1995 | WIPO . |
| 9510106 | 4/1995 | WIPO . |

*Primary Examiner*—Georgia Y. Epps
*Assistant Examiner*—Ricky Mack
*Attorney, Agent, or Firm*—Pennie & Edmonds LLP

[57] ABSTRACT

A head-mounted display apparatus comprises an image display device, a beam splitter for partially transmitting and partially reflecting light from the image display device, a reflection mirror, and a first and a second magnifying lenses. The image display device is disposed in front of a right eye of an observer and displays images on the basis of video signals from a video signal source. The beam splitter, disposed between the image display device and the right eye, splits the light from the image display device into two light beams. The reflection mirror, disposed in front of a left eye, reflects the light from the beam splitter to the left eye. The first and the second magnifying lenses are respectively disposed between the beam splitter and the right eye and between the reflection mirror and the left eye, thereby enabling the observer to see enlarged virtual image formed at a certain distance from the eyes. The head-mounted display apparatus of the present invention can also provide a stereoscopic vision by displaying images on the image display device on the basis of the principle of binocular parallax.

14 Claims, 6 Drawing Sheets

(12)

HEAD-MOUNTED DISPLAY APPARATUS WITH A SINGLE IMAGE DISPLAY DEVICE

FIELD OF THE INVENTION

The present invention relates to a head-mounted display apparatus; and, more particularly, to a head-mounted display apparatus incorporating therein a single image display device.

DESCRIPTION OF THE PRIOR ART

There is shown in FIG. 1 a schematic diagram of a conventional head-mounted display apparatus comprising a pair of image display devices 1, 2, e.g., liquid crystal displays, and a pair of magnifying lenses 3, 4.

The image display devices 1, 2, disposed in front of left and right eyes 5, 6 of an observer, respectively, are connected to a video signal source (not shown) and display images on the basis of video signals therefrom.

The magnifying lenses 3, 4 are positioned between the image display devices 1, 2 and the left and the right eyes 5, 6, respectively, thereby enabling the observer to see enlarged virtual images formed at a certain distance from the eyes 5, 6.

However, as a result of the presence of two image display devices, such a conventional head-mounted display apparatus is fairly heavy, making it burdensome on the observer's head. In addition, there exists a complicated circuit for transmitting the video signals to the individual image display device.

SUMMARY OF THE INVENTION

It is, therefore, a primary object of the invention to provide a head-mounted display apparatus having a reduced weight and a simplified circuit by incorporating therein a single image display device.

In accordance with an aspect of the present invention, there is provided a head-mounted display apparatus comprising: an image display device for displaying images; means for splitting light from the image display device into two light beams, one of the light beams being led to one eye of an observer; a reflection mirror for reflecting the other light beam split by the light splitting means to the other eye of the observer; and a first and a second magnifying lenses disposed between the beam splitter and one eye of the observer and between the reflection mirror and the other eye, respectively.

In accordance with another aspect of the present invention, there is provided a head-mounted display apparatus comprising: an image display device for displaying images; means for splitting light from the image display device into two light beams; a reflection mirror for reflecting one of the light beams split by the light splitting means; a first and a second half mirrors for reflecting the other light beam split by the splitting means and the light beam reflected by the reflection mirror, respectively; and a first and a second concave reflection mirrors for reflecting the light beams from the first and the second half mirrors to one eye and the other eye of an observer, respectively.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 1:
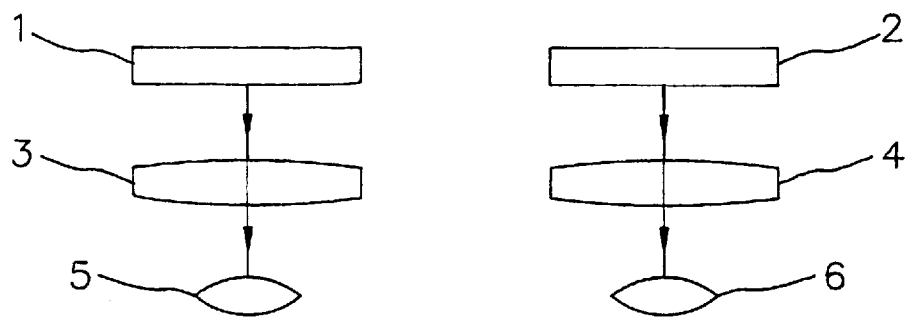
FIG. 1 shows a schematic diagram of a conventional head-mounted display apparatus.

There are shown in FIGS. 2 to 7 various views of the head-mounted display apparatus of the present invention, wherein like reference numerals represent same components.

Figure 2:
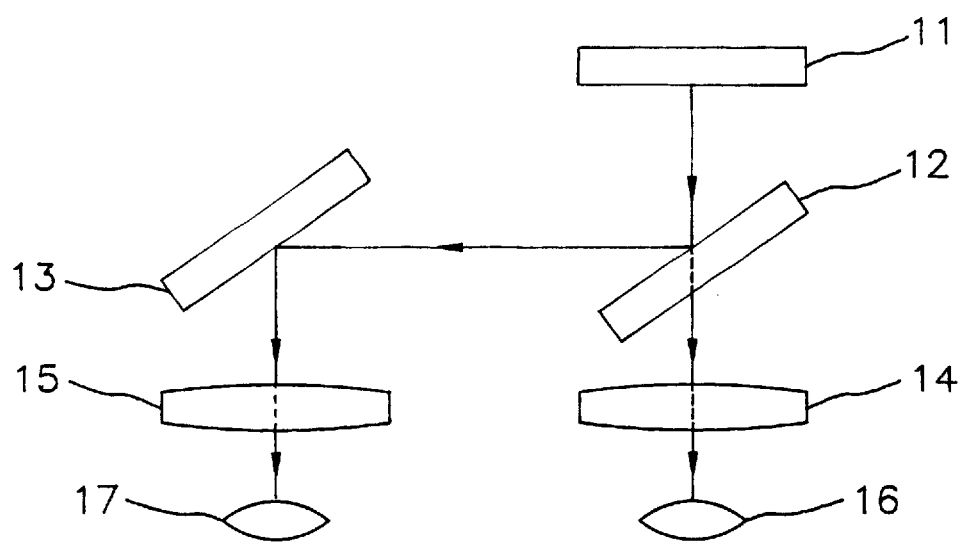
FIGS. 2 and 3 illustrate a schematic diagram and a schematic perspective view of a head-mounted display apparatus in accordance with a preferred embodiment of the present invention, respectively.
Figure 3:
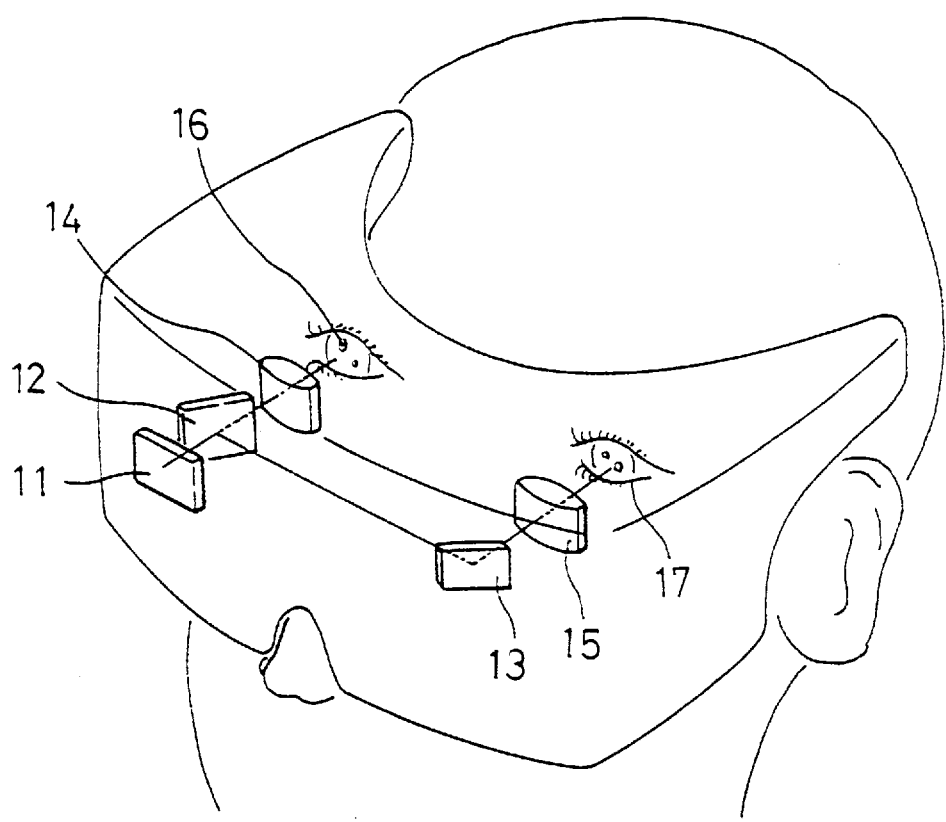

There are respectively shown in FIGS. 2 and 3 a schematic diagram and a schematic perspective view of a head-mounted display apparatus in accordance with a preferred embodiment of the present invention. The head-mounted display apparatus of the first preferred embodiment comprises an image display device 11, e.g., a liquid crystal display or cathode ray tube, a beam splitter 12 for partially transmitting and partially reflecting light from the image display device 11, a reflection mirror 13, and a first and a second magnifying lenses 14, 15.

The image display device 11, disposed in front of, e.g., a right eye 16 of an observer, is connected to a video signal source (not shown) such as a personal computer, a video cassette recorder, a laser disc player etc., and displays images on the basis of video signals therefrom.

The beam splitter 12, disposed between the image display device 11 and the right eye 16, partially transmits and partially reflects the light from the image display device 11 in proportion of 1:1, thereby splitting it into two light beams. One of the light beams is led through the beam splitter 12 to the right eye 16 and the other is led to the reflection mirror 13 disposed in front of a left eye 17 of the observer, and is, then, totally reflected by the reflection mirror 13 to the left eye 17.

The first and the second magnifying lenses 14, 15 are respectively disposed between the beam splitter 12 and the right eye 16 and between the reflection mirror 13 and the left eye 17, thereby enabling the observer to see enlarged virtual image formed at a certain distance from the eyes 16, 17.

The head-mounted display apparatus of the present invention can also provide a stereoscopic vision by displaying images on the image display device on the basis of the principle of binocular parallax.

Figure 4:
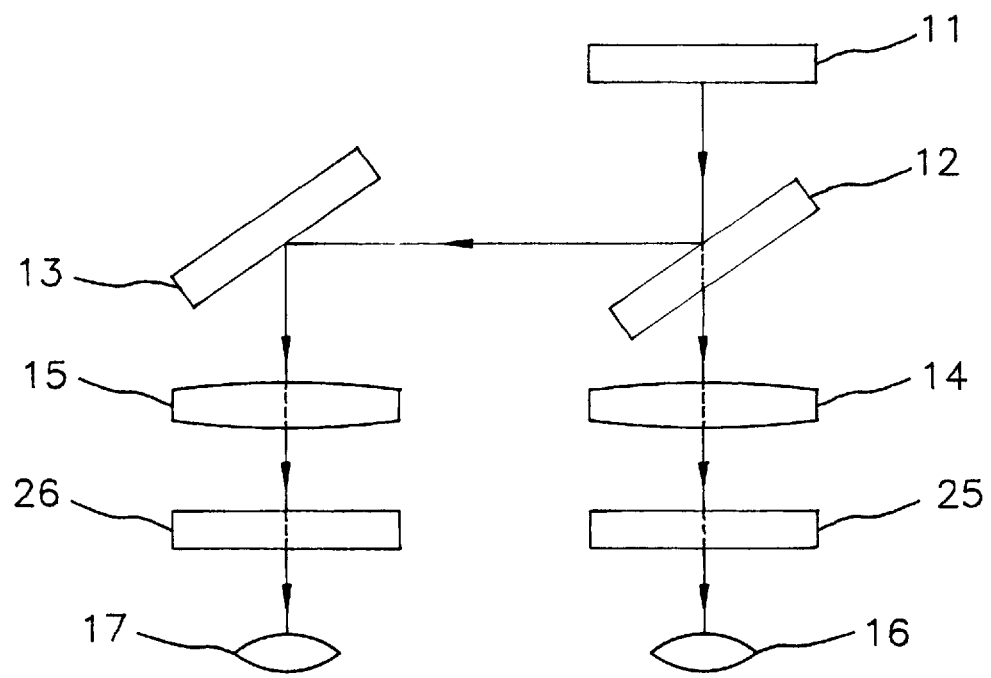
FIGS. 4 and 5 illustrate a schematic diagram and a schematic perspective view of a head-mounted display apparatus in accordance with the third preferred embodiment of the present invention, respectively.
Figure 5:
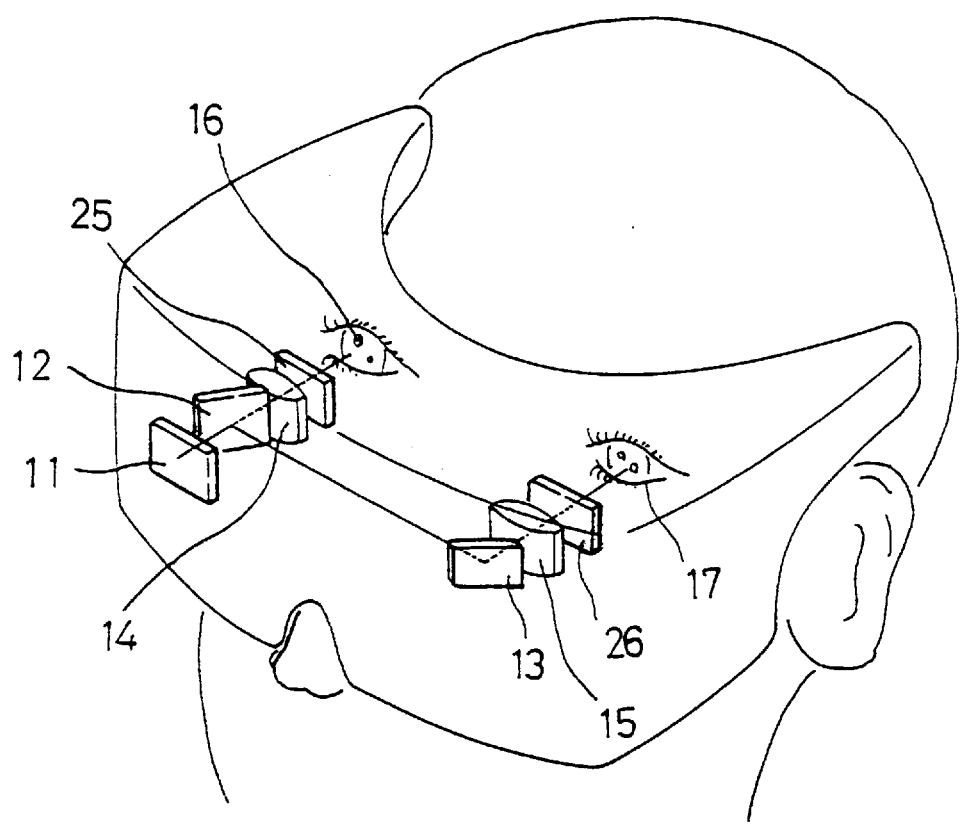

There are shown in FIGS. 4 and 5 a schematic diagram and a schematic perspective view of a head-mounted display apparatus in accordance with another preferred embodiment of the present invention, respectively, which provides a stereoscopic vision. The head-mounted display apparatus of the second preferred embodiment, as compared with the first, further comprises a first and a second shutter glasses 25, 26 disposed between the first magnifying lens 14 and the right eye 16 and between the second magnifying lens 15 and the left eye 17, wherein the image display device 11 alternately displays right-eye and left-eye images photographed from two different directions or angles.

The first and the second shutter glasses 25, 26, synchronized with the right-eye and the left-eye images displayed on the image display device 11, become alternately clear and cloudy so that the observer is able to see three dimensional images. The first and the second shutter glasses 25, 26 are made of a liquid crystal material, as disclosed in detail in U.S. Pat. Nos. 4,907,860 and 5,539,423, which are incorporated herein by reference.

Figure 6:
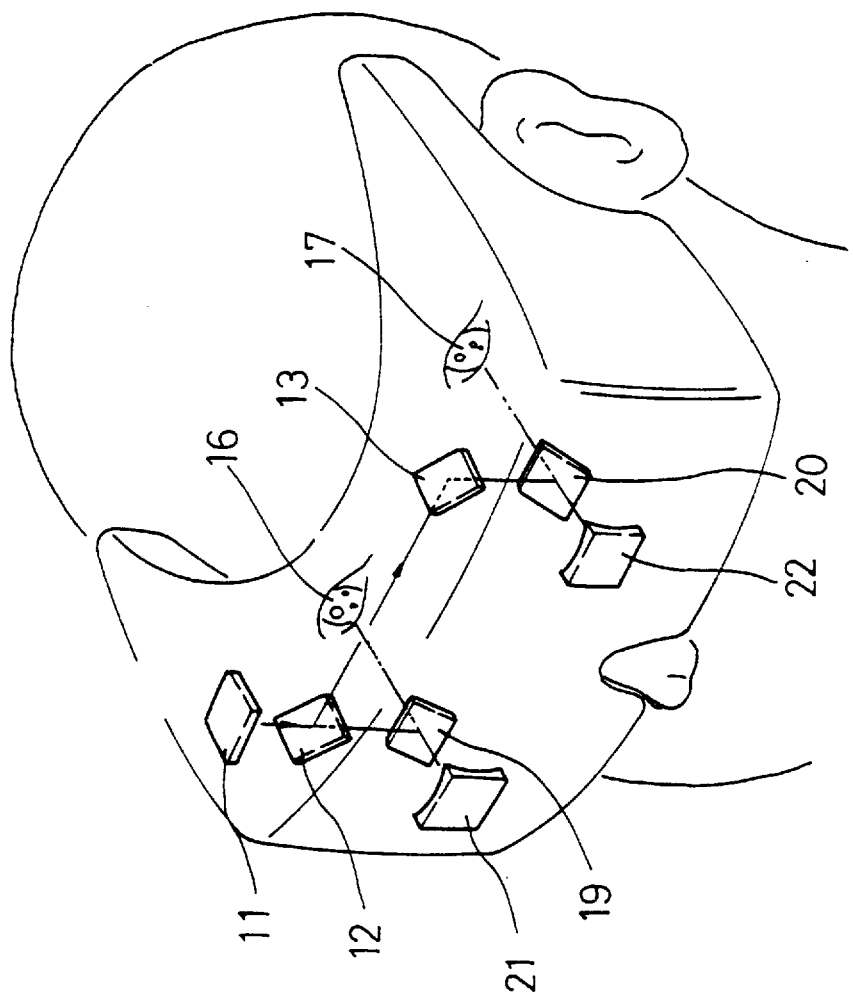
FIG. 6 sets forth a schematic perspective view of a head-mounted display apparatus in accordance with another preferred embodiment of the present invention.

Furthermore, there is shown in FIG. 6 a schematic perspective view of a head-mounted display apparatus in accordance with further another preferred embodiment of the present invention. The head-mounted display apparatus of the third preferred embodiment comprises an image display device 11, a beam splitter 12 for partially transmitting and partially reflecting the light from the image display device 11, a reflection mirror 13, a first and a second half mirrors 19, 20 and a first and a second concave reflection mirrors 21, 22.

The image display device 11 is disposed on the frontal and upper side of the right eye 16 of the observer, and the beam splitter 12 is positioned thereunder. Furthermore, the reflection mirror 13 is disposed, on the same level as that of the beam splitter, on the left side of the observer.

The first and the second half mirrors 19, 20 are positioned under the beam splitter 12 and the reflection mirror 13, corresponding to the right and the left eyes 16, 17, respectively. The first and the second concave reflection mirrors 21, 22 are disposed on the reflection side of the half mirrors 19, 20.

The beam splitter 12 partially transmits and partially reflects the light from the image display device 11 in proportion of 1:1. The first half mirror 19 partially reflects the light from the beam splitter 12 to the concave reflection mirror 21, and the light from the first concave reflection mirror 21 is transmitted through the half mirror 19 to the right eye 16.

On the other hand, the reflection mirror 13 totally reflects the light reflected by the beam splitter 12 to the second half mirror 20. The second half mirror 20 partially reflects the light from the reflection mirror 13, and the light from the second concave reflection mirror 22 is, then, transmitted through the second half mirror 20 to the left eye 17.

Figure 7:
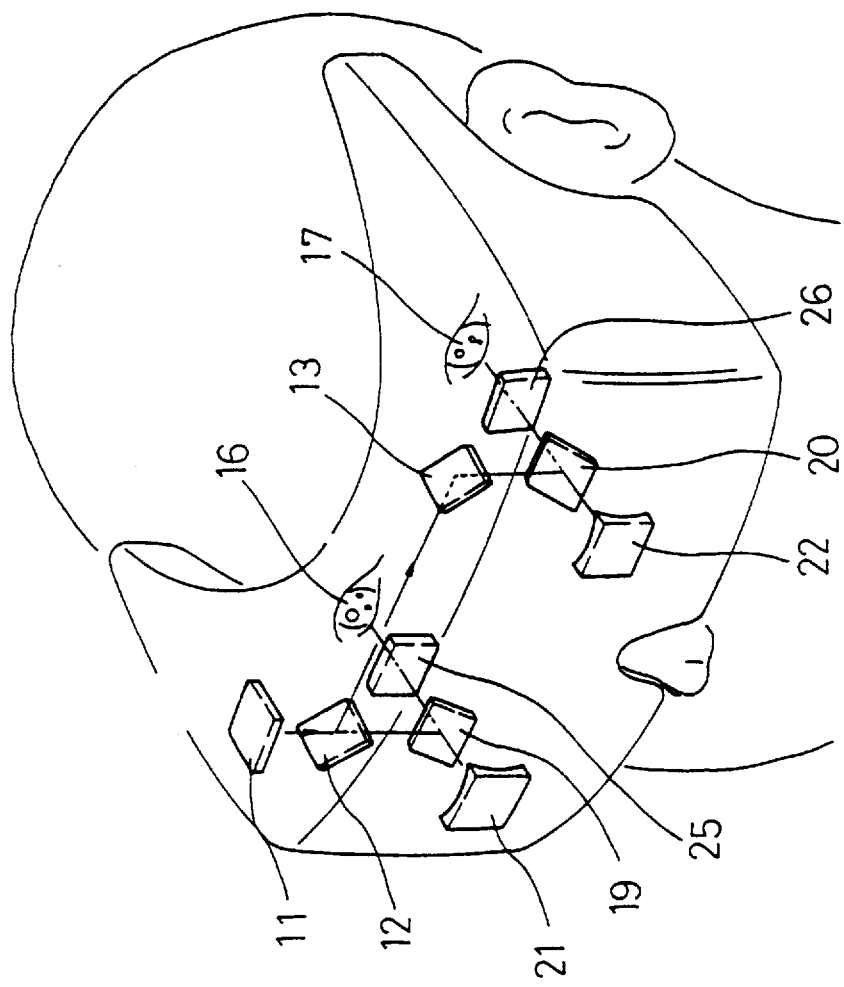
FIG. 7 sets forth a schematic perspective view of a head-mounted display apparatus in accordance with the fourth preferred embodiment of the present invention.

Furthermore, there is shown in FIG. 7 a schematic diagram of a head-mounted display apparatus in accordance with the fourth preferred embodiment of the present invention, which provides a stereoscopic vision. The head-mounted display apparatus of the fourth preferred embodiment, as compared to the third, further comprises the first and the second shutter glasses 25, 26 disposed between the first half mirror 19 and the right eye 16 and between the second half mirror 20 and the left eye 17, and the image display device 11 alternately displays right-eye and left-eye images photographed from two different directions or angles.

The first and the second shutter glasses 25, 26, synchronized with the right-eye and the left-eye images displayed on the image display device 11, become alternately clear and cloudy so that the observer is able to see three dimensional images.

In such head-mounted display apparatuses of the present invention, since only one image display device is required, the weight thereof is decreased, thereby reducing the burden on the observer's head. In addition, the circuit for transmitting the video signals to the image display device is much more simpler.

Although the invention has been shown and described with respect to the preferred embodiments, it will be understood by those skilled in the art that various changes and modifications may be made without departing from the spirit and scope of the invention as defined in the following claims.

What is claimed is:

1. A head-mounted display apparatus comprising:
   an image display device for displaying images;
   a beam splitter partially transmitting and partially reflecting the light from the image display device in proportion of substantially 1:1;
   a reflection mirror for reflecting one of the light beams split by the beam splitter;
   a first and a second half mirror for reflecting the other light beam split by the beam splitter and the light beam reflected by the reflection mirror, respectively;
   a first and a second concave reflection mirror for reflecting the light beams from the first and the second half mirrors to one eye and the other eye of an observer, respectively; and
   a first and a second shutter glasses disposed between the first half mirror and one eye of the observer and between the second half mirror and the other eye of the observer, respectively, wherein the image display device alternately displays right-eye and left-eye images photographed from different angles, and the first and the second shutter glasses, synchronized with the right-eye and the left-eye images displayed on the image display device, become alternately clear and cloudy so that the observer is able to see three dimensional images.

2. The apparatus of claim 1, wherein the first and the second shutter glasses are made of a liquid crystal material.

3. A head-mounted display apparatus comprising:
   an image display device for displaying images disposed on a frontal upside of a first eye of an observer and aligned with the first eye;
   a beam splitter partially transmitting and partially reflecting the light from the image display device, the beam splitter positioned under said image display device;
   a reflection mirror for reflecting one of the light beams split by the beam splitter, the reflection mirror disposed on the same level as that of the beam splitter, corresponding to a second eye of the observer;
   a first and a second half mirror for reflecting the other light beam split by the beam splitter and the light beam reflected by the reflection mirror, respectively, wherein the first half mirror is positioned under the beam splitter, corresponding to the first eye and the second half mirror is positioned under the reflection mirror, corresponding to the second eye of the observer;
   a first and a second concave reflection mirror for reflecting the light beams from the first and the second half mirrors to the first eye and the second eye, respectively, wherein the first concave reflection mirror is disposed on the reflection side of the first half mirror and the second concave reflection mirror is disposed on the reflection side of the second half mirror; and
   a first and a second shutter glasses disposed between the first half mirror and first eye of the observer and between the second half mirror and the second eye of the observer, respectively, wherein the image display device alternately displays right-eye and left-eye images photographed from different angles, and the first and the second shutter glasses, synchronized with the right-eye and the left-eye images displayed on the image display device, become alternately clear and cloudy so that the observer is able to see, three dimensional images.

4. The apparatus of claim 3, wherein the first and the second shutter glasses are made of a liquid crystal material.

5. The apparatus of claim 3, wherein the beam splitter partially transmits and partially reflects the light from the image display device in proportion of substantially 1:1.

6. A head-mounted display apparatus for used by an observer having a first eye and a second eye, said display apparatus comprising:

an image display device for displaying images and emitting a light, the image display device is aligned with the first eye;

a beam splitter for splitting the light from the image display device into a first light beam and a second light beam;

a reflection mirror for reflecting the second light beam from the beam splitter;

a first half mirror for reflecting the first light beam from the beam splitter;

a second half mirror for reflecting the second light beam reflected by the reflection mirror;

a first concave reflection mirror for reflecting the first light beam from the first half mirror to the first eye; and a second concave reflection mirror for reflecting the second light beam from the second half mirror to the second eye.

7. The apparatus of claim 6, further including only one reflection mirror.

8. The apparatus of claim 6, wherein beam splitter partially transmits the light from the image display device as the first light beam and partially reflects the light from the image display device as the second light beam in proportion of substantially 1:1.

9. The apparatus of claim 8, wherein a first shutter glass is disposed between the first half mirror and the first eye, and a second shutter glass is disposed between the second half mirror the second eye, wherein the image display device alternately displays right-eye and left-eye images photographed from different angles, and the first and the second shutter glasses, synchronized with the right-eye and the left-eye images displayed on the image-display device, become alternately clear and cloudy so that the observer is able to see three dimensional images.

10. The apparatus of claim 9, wherein the beam splitter is aligned with the first eye and the reflection mirror is aligned with the second eye.

11. The apparatus of claim 10, wherein the image display device is disposed above the first eye.

12. The apparatus of claim 11, wherein the reflection mirror and the beam splitter are disposed on the same level.

13. The apparatus of claim 12, wherein the first half mirror is positioned under the beam splitter, and the second half mirror is positioned under the reflection mirror.

14. The apparatus of claim 13, wherein the, first concave reflection mirror is disposed on the reflection side of the first half mirror and the second concave reflection mirror is disposed on the reflection side of the second half mirror.

* * * * *